(12) United States Patent
Suzuki et al.

(10) Patent No.: US 10,827,769 B2
(45) Date of Patent: Nov. 10, 2020

(54) ANTHOCYANIN DYE PREPARATION (71) Applicant: SAN-EI GEN F.F.I., INC., Toyonaka-shi, Osaka (JP)

(72) Inventors: Mayu Suzuki, Toyonaka (JP); Minoru Iniwa, Toyonaka (JP); Masashi Imai, Toyonaka (JP); Koji Nishiyama, Toyonaka (JP)

(73) Assignee: SAN-EI GEN F.F.I., INC., Osaka (JP)

( * ) Notice: Subject to any disclaimer, the term of this patent is extended or adjusted under 35 U.S.C. 154(b) by 279 days.

(21) Appl. No.: 15/571,692

(22) PCT Filed: May 12, 2016

(86) PCT No.: PCT/JP2016/064170
§ 371 (c)(1),
(2) Date: Nov. 3, 2017

(87) PCT Pub. No.: WO2016/182023
PCT Pub. Date: Nov. 17, 2016

(65) Prior Publication Data
US 2018/0125105 A1    May 10, 2018

(30) Foreign Application Priority Data
May 12, 2015    (JP) .............................. 2015-097745

(51) Int. Cl.
| A23L 5/43 | (2016.01) |
| A23L 5/41 | (2016.01) |
| A23L 29/10 | (2016.01) |
| A23L 2/58 | (2006.01) |
| C09B 61/00 | (2006.01) |

(52) U.S. Cl.
CPC .................. *A23L 5/43* (2016.08); *A23L 2/58* (2013.01); *A23L 5/41* (2016.08); *A23L 29/10* (2016.08); *C09B 61/00* (2013.01); *A23V 2002/00* (2013.01); *A23V 2200/044* (2013.01); *A23V 2200/222* (2013.01); *A23V 2250/054* (2013.01); *A23V 2250/192* (2013.01); *A23V 2250/2104* (2013.01); *A23V 2250/5028* (2013.01); *A23V 2250/5056* (2013.01); *A23V 2250/5072* (2013.01); *A23V 2250/5086* (2013.01); *A23V 2250/51082* (2013.01); *A23V 2300/31* (2013.01); *A23V 2300/50* (2013.01)

(58) Field of Classification Search
CPC ............... A23L 5/41; A23L 5/43; A23L 29/10
USPC ................................................... 426/103, 250
See application file for complete search history.

(56) References Cited

U.S. PATENT DOCUMENTS

| 9,642,381 B2 | 5/2017 | Ley et al. |
| 2009/0238932 A1 | 9/2009 | Nishiyama et al. |
| 2013/0216665 A1 | 8/2013 | Mason et al. |
| 2014/0170083 A1 | 6/2014 | Ley et al. |

FOREIGN PATENT DOCUMENTS

| CN | 102604424 | | 7/2012 |
| EP | 2545787 | A1 | 1/2013 |
| JP | S6075256 | A | 4/1985 |
| JP | S63218767 | A | 9/1988 |
| JP | S6490264 | A | 4/1989 |
| JP | H109255889 | A | 9/1997 |
| JP | H111146766 | A | 6/1999 |
| JP | 2000270807 | A | 10/2000 |
| JP | 2001064531 | A | 3/2001 |
| JP | 2001064531 | A * | 3/2001 |
| JP | 2002218991 | A | 8/2002 |
| JP | 2006517408 | A | 7/2006 |
| JP | 2013166831 | A | 8/2013 |
| JP | 2014001292 | A | 1/2014 |
| JP | 2014516980 | A | 7/2014 |
| WO | 2004068971 | A1 | 8/2004 |
| WO | 2008032006 | A1 | 3/2008 |

OTHER PUBLICATIONS

International Search Report (English and Japanese) and Written Opinion of PCT/JP2016?064170, dated Aug. 9, 2016.
Supplementary Extended European Search Report dated Oct. 9, 2018, issued in the corresponding European patent application No. 16792748.2.
Office Action issued for the corresponding Chinese Patent Application No. 201680027405.1, dated Mar. 10, 2020, 21 pages including English translation.

* cited by examiner

*Primary Examiner* — Jyoti Chawla
(74) *Attorney, Agent, or Firm* — Hamre, Schumann, Mueller & Larson, P.C.

(57) ABSTRACT

An object of the present invention is to provide a technique of suppressing precipitation of an anthocyanin pigment in a range other than the highly acidic range.
The present invention provides an anthocyanin pigment preparation, comprising:
  an anthocyanin pigment; and
  an emulsifier,
  wherein the pH when the anthocyanin pigment preparation is diluted with water or dissolved in water so that a color value becomes 10 is more than 3.

2 Claims, 1 Drawing Sheet

ANTHOCYANIN DYE PREPARATION

TECHNICAL FIELD

The present invention relates to an anthocyanin pigment preparation.

BACKGROUND ART

Until now, synthetic pigments and natural pigments have been widely used to add colors to food products. In particular, in recent years, natural pigments are used more often because natural pigments seem safe and healthy.

Among such natural pigments, anthocyanin pigments, which are water-soluble pigments widely present in the plant kingdom, exhibit a vivid red color in the acidic range and advantageously ensure relatively high chemical stability as a pigment against heat and light. Therefore, to add a desired color to an acidic food product, anthocyanin pigments have been widely used alone or in combination with a blue pigment, a yellow pigment, and the like. Further, anthocyanin pigments are known for color change due to change in pH, which tends to exhibit a red color in the acidic range and a purple color in the neutral range.

However, the chemical stability of anthocyanin pigments is a characteristic particular in the acidic range. It is known that, as the pH increases, the chemical stability of anthocyanin pigments significantly decreases, and the pigments easily undergo a chemical change due to heat or light, resulting in the color fading or changing.

Therefore, in fact, the use of anthocyanin pigments is limited to food products that have relatively strong acidity (e.g., pH of 3 or less).

With such a technical background, Patent Document 1 suggests a technique using (A) a citrate buffer and/or a phosphate buffer, and, as a polymer, (B) methylcellulose, to increase chemical stability of anthocyanin in a range other than the highly acidic range, although this technique does not focus on the function of anthocyanin as a pigment but focuses on the visual function improvement effects or the whitening effects of anthocyanin.

CITATION LIST

Patent Documents

Patent Document 1: JP2014-001292

SUMMARY OF INVENTION

Technical Problem

In the technique disclosed in Patent Document 1, it was confirmed that cyanidin 3-glucoside, which is one of the coloring principle substances of anthocyanin pigment, was chemically stabilized in a range other than the highly acidic range, and that cyanidin 3-glucoside remained at a high proportion even after storage for a predetermined time.

However, the present inventors found a new problem that, when an anthocyanin pigment is used for a food product in a range other than the highly acidic range, the anthocyanin pigment undergoes precipitation.

Therefore, an object of the present invention is to provide a technique of suppressing precipitation of an anthocyanin pigment in a range other than the highly acidic range.

Solution to Problem

The present inventors carried out extensive research and found that the precipitation of an anthocyanin pigment in a range other than the highly acidic range can be suppressed by having the anthocyanin pigment be present with an emulsifier. With this finding, the inventors completed the present invention.

The present invention encompasses the following aspects.

Item 1. An anthocyanin pigment preparation, comprising:
an anthocyanin pigment; and
an emulsifier,
wherein the pH when the anthocyanin pigment preparation is diluted with water or dissolved in water so that a color value becomes 10 is more than 3.

Item 2. The anthocyanin pigment preparation according to Item 1, wherein an aqueous solution having a concentration at a color value of 10 has a pH in a range of 3.5 to 10.

Item 3. The anthocyanin pigment preparation according to Item 1 or 2, wherein the anthocyanin pigment preparation is a liquid.

Item 4. The anthocyanin pigment preparation according to Item 1 or 2, wherein the anthocyanin pigment preparation is a powder.

Item 5. The anthocyanin pigment preparation according to any one of Items 1 to 4, wherein the color value is in a range of 10 to 700.

Item 6. The pigment preparation according to any one of Items 1 to 5, wherein the pigment preparation contains an alkalifying agent.

Item 7. The anthocyanin pigment preparation according to any one of Items 1 to 6, wherein the emulsifier is one or more emulsifiers selected from the group consisting of glycerin fatty acid esters, quillaia extracts, polysorbates, pectin, gum arabic, gum ghatti, xanthan gum, sodium carboxymethylcellulose, and water-soluble soybean polysaccharides.

Item 8. The anthocyanin pigment preparation according to any one of Items 1 to 7, wherein the anthocyanin pigment is one or more pigments selected from the group consisting of red radish pigments, purple sweet potato pigments, grape juice pigments, and red cabbage pigments.

Item 9. The pigment preparation according to any one of Items 1 to 8, wherein, when a pigment solution A having a color value of 20 is prepared by diluting a sample of the pigment preparation with water or dissolving the sample in water, or, if the sample of the pigment preparation contains ethanol, when a pigment solution A' is prepared by removing ethanol by concentrating a mixed liquid of 100 g of the pigment solution A and 50 g of water using a rotary evaporator at 40° C. until the weight becomes 100 g, and when the pigment solution A or the pigment solution A' in an amount of 50 g is dispensed in a transparent plastic container, allowed to stand at 5° C. for 24 hours, then subjected to gyratory shaking for 60 minutes at an amplitude of 50 mm, 150 rpm, and 20° C., and a liquid portion is obtained from the container by decantation immediately thereafter; the liquid portion has a color value of 15 or more.

Item 10. An anthocyanin pigment preparation comprising an anthocyanin pigment in a combination of an emulsifier and an alkalifying agent,
wherein the pH when the emulsifier, the alkalifying agent, and the anthocyanin pigment are diluted with water or dissolved in water so that a color value becomes 10 is more than 3.

Item 11. An agent for suppressing generation of precipitates of an anthocyanin pigment in a pH range more than a pH of 3, the agent comprising an emulsifier.

Item 12. A method for suppressing generation of precipitates of an anthocyanin pigment in a pH range more than a pH of 3, the method comprising the step of bringing an anthocyanin pigment in which precipitates are not generated into contact with an emulsifier.

Item 13. A method for producing an anthocyanin pigment preparation in which generation of precipitates of an anthocyanin pigment in a pH range more than a pH of 3 is suppressed, the method comprising the step of mixing an anthocyanin pigment in which precipitates are not generated with an emulsifier.

Item 14. A food comprising the pigment preparation according to any one of Items 1 to 10.

Item 15. The food according to Item 14, wherein the food has a water content of 85 mass % or less.

Item 16. A method for coloring a food, comprising adding the anthocyanin pigment preparation according to any one of Items 1 to 10 to a food.

Item 17. A method for producing a colored food, comprising adding the anthocyanin pigment preparation according to any one of Items 1 to 10 to a food.

Advantageous Effects of Invention

The present invention suppresses precipitation of an anthocyanin pigment in a range other than the highly acidic range, i.e., suppresses generation of precipitates containing an anthocyanin pigment.

DESCRIPTION OF EMBODIMENTS

Terms

The symbols and the abbreviations in this specification are to be interpreted as having the general meanings in the related technical field to which the present invention pertains, according to the context of this specification, unless otherwise specified.

In this specification, the terms "comprise" and "contain" are intended to mean both "consist essentially of" and "consist of."

Temperature Conditions

Unless otherwise specified, the operations and the like described in this specification may be performed at room temperature. In this specification, "room temperature" refers to a temperature ranging from 20 to 30° C.

Anthocyanin Pigment Preparation

The anthocyanin pigment preparation of the present invention comprises:

an anthocyanin pigment; and an emulsifier, wherein the pH when the anthocyanin pigment preparation is diluted with water or dissolved in water so that the color value becomes 10 is more than 3.

Anthocyanin Pigment

The anthocyanin pigment used in the present invention is preferably an anthocyanin pigment that generates precipitates when a pigment solution having a color value of 20.00 in purified water is prepared and the solution is allowed to stand for 24 hours at 5° C.

For example, according to the research by the present inventors, a purple carrot pigment does not generate precipitates under the above conditions.

Examples of the anthocyanin pigments used in the present invention include purple carrot pigments, red cabbage pigments, red radish pigments, Perilla pigments, hibiscus pigments, grape juice pigments, grape skin pigments, purple sweet potato pigments, purple corn pigments, elderberry pigments, and boysenberry pigments. Preferable examples of the anthocyanin pigments used in the present invention include red cabbage pigments, red radish pigments, Perilla pigments, hibiscus pigments, grape juice pigments, grape skin pigments, purple sweet potato pigments, purple corn pigments, elderberry pigments, and boysenberry pigments.

Examples of anthocyanin pigments used in the present invention also include pigments containing, as a coloring principle, cyanidin-acylglucoside, pigments containing, as a coloring principle, cyanidin-glucoside, pigments containing, as a coloring principle, peonidin-acylglucoside, pigments containing, as a coloring principle, delphinidin-glucoside, pigments containing, as a coloring principle, malvidin 3-glucoside, pigments containing, as a coloring principle, cyanidin 3-glucoside, and pigments containing, as a coloring principle, pelargonidin-acylglycoside.

The compound contained in an anthocyanin pigment as a coloring principle varies depending on the type of the anthocyanin pigment.

For example, a red cabbage pigment contains cyanidin-acylglucoside, a purple sweet potato pigment contains cyanidin-acylglucoside and peonidin-acylglucoside, a grape juice pigment contains malvidin 3-glucoside, a purple corn pigment contains cyanidin 3-glucoside, and a red radish pigment contains pelargonidin-acylglycoside.

In the present invention, one kind of anthocyanin pigment may be used solely or two or more anthocyanin pigments may be used in combination.

The anthocyanin pigment used in the present invention is preferably at least one pigment selected from the group consisting of red cabbage pigments, red radish pigments, grape juice pigments and purple sweet potato pigments.

The content of the anthocyanin pigment in the preparation of the present invention is not particularly limited; for example, the content may be similar to the content of anthocyanin pigment in a general anthocyanin pigment preparation.

As is usual in the field of pigments, the content of the anthocyanin pigment in the preparation of the present invention can alternatively be expressed by a "color value."

The upper limit of the color value of the preparation of the present invention is not particularly limited; for example, the color value of the preparation of the present invention may be 1000 or less, 700 or less, or 500 or less.

The lower limit of the color value of the preparation of the present invention is not particularly limited; for example, the color value of the preparation of the present invention may be 10 or more, 20 or more, 30 or more, 40 or more, 50 or more, 60 or more, 70 or more, 80 or more, or 90 or more.

The color value of the preparation of the present invention may be, for example, in a range of 10 to 1000, in a range of 20 to 700, in a range of 30 to 700, in a range of 40 to 500, in a range of 50 to 500, in a range of 60 to 500, in a range of 70 to 500, in a range of 80 to 500, or in a range of 90 to 500.

A preferable color value of the preparation of the present invention may vary depending on the form of the preparation described later.

For example, when the preparation of the present invention is a liquid, the color value may be, for example, 500 or less, 400 or less, or 300 or less;

the color value may be, for example, 10 or more, 20 or more, 30 or more, 40 or more, 50 or more, 60 or more, 70 or more, 80 or more, or 90 or more;

the color value may be, for example, in a range of 10 to 500, in a range of 20 to 500, in a range of 30 to 400, in a range of 40 to 400, in a range of 50 to 400, in a range of 60 to 400, in a range of 70 to 400, in a range of 80 to 300, or in a range of 90 to 300.

For example, when the preparation of the present invention is a solid, the color value may be, for example, 1000 or less, 700 or less, or 500 or less;

the color value may be, for example, 10 or more, 20 or more, 30 or more, 40 or more, 50 or more, 60 or more, 70 or more, 80 or more, or 90 or more;

the color value may be, for example, in a range of 10 to 1000, in a range of 20 to 700, in a range of 30 to 700, in a range of 40 to 500, in a range of 50 to 500, in a range of 60 to 500, in a range of 70 to 500, in a range of 80 to 500, or in a range of 90 to 500.

In this specification, "color value" is a value denoting a density of a pigment, as can be generally understood by a person skilled in the art in the field of pigments.

The "color value" is expressed by a value ($E^{10\%}_{1\ cm}$) obtained by converting an absorbance at a maximum absorption wavelength in the visible range of a pigment-containing substance, such as a pigment preparation, to an absorbance of a 10 w/v % solution.

In the present invention, the color value ($E^{10\%}_{1\ cm}$) is referred to as a value determined according to the method described in "17. Measurement of Color Value" in Japan's Specifications and Standards for Food Additives, and is specifically determined as follows.

(1) A sample is precisely weighed within a range in which the measurement absorbance falls within a range of 0.3 to 0.7, and a citrate buffer (pH of 3.0) is added to make the amount precisely 100 ml, thereby preparing a test solution. In this step, if the test solution contains precipitates, the supernatant is obtained by centrifugation and the resulting supernatant is used as a test liquid.

(2) Using a citrate buffer as a control, absorbency A is measured at a maximum absorption wavelength in a wavelength range of 500 to 550 nm and at a liquid layer length of 1 cm, and the color value ($E^{10\%}_{1\ cm}$) as a measurement target is determined according to the formula below.

Color value($E^{10\%}_{1\ cm}$)=($A$×10)/sample collection amount (g)

Emulsifier

Examples of emulsifiers used in the present invention include sucrose fatty acid esters, glycerin fatty acid esters (e.g., monoglycerin fatty acid esters, polyglycerin fatty acid esters, polyglycerin condensed ricinoleic acid esters, organic acid monoglycerides), propylene glycol fatty acid esters, sorbitan fatty acid esters, lecithin (e.g., plant lecithin, egg-yolk lecithin), enzyme-degraded lecithin (e.g., lysolecithin), enzymatically modified lecithin, sodium stearoyl lactate, calcium stearoyl lactate, quillaia extracts, saponin, polysorbates (e.g., polysorbate 20, polysorbate 60, polysorbate 65, polysorbate 80), pectin, gum arabic, xanthan gum, gum ghatti, modified starch (e.g., starch sodium octenylsuccinate), carboxymethylcellulose sodium, and water-soluble soybean polysaccharides.

In the present invention, one kind of emulsifier may be used solely or two or more emulsifiers may be used in combination.

The emulsifier used in the present invention is preferably at least one emulsifier selected from the group consisting of glycerin fatty acid esters, (e.g., monoglycerin fatty acid esters, polyglycerin fatty acid esters, polyglycerin condensed ricinoleic acid esters, organic acid monoglycerides), lecithin (e.g., plant lecithin), quillaia extracts, polysorbates, pectin, gum arabic, gum ghatti, xanthan gum, carboxymethylcellulose sodium, and water-soluble soybean polysaccharides.

The amount of the emulsifier in the present invention may vary depending on the amount of the anthocyanin pigment of the present invention.

The amount of the emulsifier in the present invention may be, for example, 3.5 wt % or less, 2.5 wt % or less, or 1.5 wt % or less, based on a color value of 1 of the pigment preparation. The amount of the emulsifier in the present invention may be, for example, 0.005 wt % or more, 0.01 wt % or more, or 0.02 wt % or more, based on a color value of 1 of the pigment preparation.

The amount of the emulsifier in the present invention may be, for example, in a range of 0.005 to 3.5 wt %, in a range of 0.01 to 2.5 wt %, or in a range of 0.02 to 1.5 wt %, based on a color value of 1 of the pigment preparation. The amount (wt %) of the emulsifier based on a color value of 1 may be calculated by dividing the emulsifier amount (wt %) contained in the pigment preparation by the color value of the pigment preparation.

The content of the emulsifier in the preparation of the present invention may be, for example, 70 wt % or less, 50 wt % or less, or 30 wt % or less.

The content of the emulsifier in the preparation of the present invention may be, for example, 0.1 wt % or more, 0.2 wt % or more, or 0.4 wt % or more.

The content of the emulsifier in the preparation of the present invention may be, for example, in a range of 0.1 to 70 wt %, in a range of 0.2 to 50 wt %, or in a range of 0.4 to 30 wt %.

pH

The pH when the anthocyanin pigment preparation of the present invention is diluted with water or dissolved in water so that the color value becomes 10 is more than 3.

The pH when the anthocyanin pigment preparation of the present invention is diluted with water or dissolved in water so that the color value becomes 10 is preferably in a range of 3.5 to 10, more preferably 3.5 to 7, further preferably 4 to 7.

With such a property, even when the anthocyanin pigment preparation of the present invention is used in a pH range outside the highly acidic range, the use of anthocyanin pigment preparation of the present invention does not decrease the pH of the target object, or decreases the pH only slightly.

In the present invention, "the pH when the pigment preparation is diluted with water or dissolved in water so that the color value becomes 10" means a pH value obtained by determining a dilution degree when the pigment preparation is diluted with a citrate buffer liquid (pH of 3.0) or dissolved in a citrate buffer solution (pH of 3.0) so that the color value becomes 10, and diluting the pigment preparation with water or dissolving it in water using the dilution degree.

Alkalifying Agent

The pigment preparation of the present invention may contain an alkalifying agent so as to obtain a desired pH when the pigment preparation is diluted with water or dissolved in water so that the color value becomes 10.

In this specification, an "alkalifying agent" means an agent capable of increasing pH among pH adjusters (hydrogen ion concentration controlling agent).

Examples of alkalifying agents include trisodium citrate, potassium gluconate, sodium gluconate, monosodium succinate, disodium succinate, sodium acetate, potassium DL-hydrogen tartrate, potassium L-hydrogen tartrate, sodium DL-tartrate, sodium L-tartrate, sodium hydroxide, potassium hydroxide, potassium carbonate, sodium carbonate, sodium hydrogencarbonate, potassium lactate, sodium lactate, sodium dihydrogen pyrophosphate, monosodium fumarate, sodium DL-malate, disodium hydrogen phosphate, sodium dihydrogen phosphate, and potassium dihydrogen phosphate.

In the present invention, one kind of alkalifying agent may be used solely or two or more alkalifying agents may be used in combination.

As can be generally understood by a person skilled in the art, for example, the alkalifying agent may be dissociated into ions when the pigment preparation of the present invention contains water.

In one embodiment of the pigment preparation of the present invention, the pigment preparation contains an anthocyanin pigment in a combination of an emulsifier and an alkalifying agent, wherein the pH when the emulsifier, the alkalifying agent, and the anthocyanin pigment are diluted with water or dissolved in water so that the color value becomes 10 is more than 3.

For example, the pigment preparation of the present invention may have a form of a kit containing a first agent containing an anthocyanin pigment and an emulsifier, and a second agent containing an alkalifying agent.

On the assumption that the pigment preparation of the present invention is used in combination with an alkalifying agent, the pigment preparation of the present invention may be a preparation containing an anthocyanin pigment and an emulsifier, and not containing an alkalifying agent.

Other Components

Insofar as the effects of the present invention are not adversely affected, the pigment preparation of the present invention may contain other components as necessary, in addition to the anthocyanin pigment, the emulsifier, and the optional alkalifying agent.

Examples of other components include diluents (or excipients), carriers, and other additives.

Specifically, examples of the diluents (or excipients) and carriers include sugars such as glucose, galactose, fructose, sucrose, lactose, maltose, trehalose, oligosaccharide, starch syrup, liquid sugar, dextrin, cyclodextrin and starch; alcohols such as ethanol, propylene glycol, and glycerin; sugar alcohols such as sorbitol, mannitol, xylitol, erythritol, and maltitol; and polysaccharides such as carrageenan, guar gum, and gellan gum; and water.

Examples of the additives include antioxidants, chelating agents, flavors, spice extracts, and antiseptics.

Examples of other components also include pigments other than anthocyanin pigments.

The amounts of the other components are not limited insofar as the effects of the present invention are not adversely affected; a person skilled in the art may set the amounts based on common technical knowledge.

Form of Pigment Preparation

Examples of the form of the pigment preparation of the present invention include solids such as powder, granules, or tablets; liquids such as solution, suspension, or emulsion; and semisolids such as paste.

The pigment preparation of the present invention is preferably a liquid in terms of easy use (e.g., easiness in pigment dissolution work, prevention of lumps, reduction in cost for powderization) or the like.

The pigment preparation of the present invention is preferably a solid in terms of storage stability, easiness in transportation and use (e.g., in terms of mixing with a powdery target object, efficiency in adding a color to a target object having a high solids content) or the like, and is more preferably powder.

In the pigment preparation of the present invention, the generation of precipitation is suppressed even when the pigment preparation is used under a condition having a pH higher than the pH at which known pigment preparations containing an anthocyanin pigment were used, or under a condition having a pH higher than the pH when the pigment preparation is diluted with water or dissolved in water so that the color value becomes 10 (e.g., a pH of more than 3, a pH of 3.5 or more, a pH of 4 or more, a pH of 4.5 or more, a pH of 5 or more).

This shows that the pigment preparation of the present invention has a sufficiently high color value of a solution even when it is exposed to a high pH.

More specifically, the pigment preparation of the present invention may be such that when a pigment solution A having a color value of 20 is prepared by diluting a sample of the pigment with water or dissolving it in water, or, if the sample of the pigment preparation contains ethanol, when a pigment solution A' is prepared by removing ethanol by concentrating a mixed liquid of 100 g of the pigment solution A and 50 g of water using a rotary evaporator at 40° C. until the weight becomes 100 g; and when the pigment solution A or the pigment solution A' is dispensed in an amount of 50 g in a transparent plastic container, allowed to stand at 5° C. for 24 hours, then is subjected to gyratory shaking for 60 minutes at an amplitude of 50 mm, 150 rpm, and 20° C., and the liquid portion is obtained from the container by decantation immediately thereafter (more specifically, without performing still standing for 1 minute or more); the color value of the liquid portion may be preferably 15 or more, more preferably 16 or more, further preferably 17 or more, further more preferably 18 or more, and particularly preferably 19 or more.

Further, the color value residual ratio calculated from this value is preferably 75% or more, more preferably 80% or more, further preferably 85% or more, further more preferably 90% or more, particularly preferably 95% or more. The color value residual ratio is calculated according to formula 1 below.

Formula 1: Color value residual ratio (%)=color value of liquid portion/20×100.

As can be generally understood by a person skilled in the art, the term "liquid portion" in this specification does not mean that portions other than the liquid portion are present. More specifically, only the liquid portion may be present in the container.

Further preferably, even when the pigment solution A having a color value of 20 is prepared from the pigment preparation of the present invention by adjusting the solution to have a higher pH (e.g., pH of 3.5 or more, 4 or more, 4.5 or more, or 5 or more) using an alkalifying agent such as sodium hydroxide, the color value of the liquid portion is preferably 15 or more, more preferably 16 or more, further preferably 17 or more, further more preferably 18 or more, particularly preferably 19 or more.

Since an operation to prepare the pigment solution A' from the sample of a pigment preparation containing ethanol does not substantially affect the color value of the liquid portion, the operation may also be performed with respect to a sample of a pigment preparation free of ethanol. In particular, if the pigment preparation may contain ethanol, an operation to prepare the pigment solution A' may be performed without confirming whether the pigment preparation contains ethanol.

Therefore, the pigment preparation of the present invention is capable of adding a color to a target object at a high level of quality even when the pigment preparation is used for coloring under a high pH condition (e.g., when the pigment preparation is used to add a color to a target object having a high pH) or is used for coloring through a high pH condition. The above expression "adding a color to a target object at a high quality" means that, for example, (1) the coloring can be done with insignificant or no unevenness, (2) the coloring can be done with insignificant or no generation of precipitates, and that (3) a dense color can be added with a small amount of preparation. Since the pigment preparation of the present invention is capable of adding a color to a target object at a high level of quality in a pH range of more than 3, it is capable of suitably adding a color tone exhibited by an anthocyanin pigment to the target object in a pH range of more than 3.

The pigment preparation of the present invention may be used in combination with other pigment preparations or pigments.

Method for Producing Pigment Preparation

The pigment preparation of the present invention may be produced through a known production method according to its form.

For example, a liquid pigment preparation may be produced by mixing an anthocyanin pigment, an emulsifier, water, and an alkalifying agent. The step of mixing an anthocyanin pigment, an emulsifier, and water may be a step of preparing an anthocyanin pigment solution having a pH of more than 3 (preferably, pH of 3.5 to 10). The pH of the anthocyanin pigment solution may be, for example, in a range of 4 to 7 (preferably, in a range of 4 to 6).

Further, for example, a powdery pigment preparation may be produced by powderizing the pigment preparation (liquid pigment preparation).

Further, for example, a powdery pigment preparation may be produced by mixing an anthocyanin pigment, an emulsifier, and water, drying the mixture to obtain a powder, and mixing the powder with a powdery alkalifying agent. The step of mixing an anthocyanin pigment, an emulsifier, and water may be a step of preparing an anthocyanin pigment solution having a pH of more than 3 (preferably, pH of 3.5 to 10). The pH of the anthocyanin pigment solution may be, for example, in a range of 4 to 7 (preferably, in a range of 4 to 6).

Further, for example, a powdery pigment preparation may be produced by mixing a powdery anthocyanin pigment, a powdery emulsifier, and a powdery alkalifying agent.

During the production of the pigment preparation of the present invention, the other components may be used in an appropriate stage according to their kind and purpose of use.

For example, an excipient may be used during the powderization of the liquid pigment preparation.

Target Object

The object to which the present invention is applied is not particularly limited insofar as it can contain an anthocyanin pigment; however, an oral product colored by an anthocyanin pigment is preferable.

Examples of the objects include food, cosmetics, pharmaceuticals, quasi-drugs, and feedstuff. Among these, food is preferable. The "food" can be any processed, semi-processed, or unprocessed substance intended to be consumed by human. The "food" encompasses all substances used to produce, prepare, or process beverages, chewing gum, and foods.

Examples of "food" include all substances used for production, preparation, and processing of beverages such as milk beverages, *Lactobacillus* beverages, fruit-juice-containing soft drinks, soft drinks, carbonated beverages, fruit juice, vegetable juice, fruit and vegetables juice, alcoholic beverages, powder beverages, coffee beverages and tea beverages; desserts such as pudding, jelly, Bavarian cream, mousse and yogurt; frozen desserts such as ice cream, ice milk, lacto ice and ice dessert; gum (stick gum, sugar-coated tablet gum); chocolates such as chocolate and chocolate coating; candies such as hard candies and soft candies (including caramels, nougats, gummy candies, and marshmallows), sugar-coated candies, and taffy; tablet confectioneries; supplements; chewing gum such as chewing gum and coated chewing gum; baked confectioneries such as biscuits, cookies, okaki and senbei (rice crackers); soups such as consommé soup and potage soup; pickles such as soy sauce pickles, salted pickles, miso pickles, kasuzuke (sake lees pickles), koji pickles, nukazuke (rice-bran paste pickles), vinegar pickles, mustard pickles, moromi (mash) pickles, umezuke (plum pickles), fukujinzuke, shibazuke, ginger pickles, and plum vinegar pickles; sauces such as dressings, ketchup, barbecue sauce, and other sauces; jams such as jams, preserves, and syrups; powdered food such as powdered beverages, powdered jellies, powdered syrups, powdered soups, and powdered seasoning, which are taken as is or after being dissolved in a solvent such as water; freeze-dried food and drinks; fruit liquor such as red wine; processed fruits such as candied cherries, apricots, apples, strawberries, and peaches; processed meats such as ham, sausage, and grilled pork; fish paste products such as fish ham, fish sausages, ground fish, kamaboko (boiled fish paste), chikuwa (boiled fish paste), hanpen (boiled fish paste), satsuma age (deep-fried fish paste), datemaki (rolled omelet) and whale bacon; dairy oil and fat products such as butter, margarine, cheese, and whipped cream; noodles such as udon, hiyamugi (wheat flour noodles), somen (thin wheat flour noodles), soba (buckwheat) noodles, Chinese noodles, spaghetti, macaroni, rice vermicelli, vermicelli, and wonton; and various processed foods such as prepared food, fu (dried wheat gluten), and (mashed and seasoned fish).

Agent for Suppressing Generation of Precipitates of Anthocyanin Pigment

The agent for suppressing generation of precipitates of anthocyanin pigment of the present invention contains an emulsifier. The suppressing agent of the present invention is understood with reference to the explanations or the like of the pigment preparation of the present invention.

When the suppressing agent of the present invention is used for an anthocyanin pigment, the precipitation of the anthocyanin pigment is suppressed even when the anthocyanin pigment is exposed to a pH of more than 3 (preferably 3.5 or more, more preferably 4 or more, further preferably 4.5 or more, further more preferably 5 or more).

Method for Suppressing Generation of Precipitates of Anthocyanin Pigment

The method for suppressing generation of precipitates of the anthocyanin pigment of the present invention is a method for suppressing generation of precipitates of the anthocyanin pigment at a pH of more than 3 (preferably 3.5 or more, more preferably 4 or more, anthocyanin pigment 4.5 or more, furthermore preferably 5 or more), the method comprising the step of bringing an anthocyanin pigment in which precipitates are not generated into contact with an emulsifier.

More specifically, according to the suppressing method of the present invention, an anthocyanin pigment is exposed to a pH of more than 3 (preferably 3.5 or more, more preferably 4 or more, further preferably 4.5 or more, further more preferably 5 or more) in the presence of an emulsifier. According to the suppressing method of the present invention, the unwanted precipitates of an anthocyanin pigment, which are generated in the absence of an emulsifier when the pigment is exposed to such a pH range, can be suppressed.

The suppressing method of the present invention is understood with reference to the explanations or the like of the pigment preparation of the present invention.

The method for bringing an anthocyanin pigment in which precipitates are not generated into contact with an emulsifier may be performed, for example, by mixing an anthocyanin pigment in which precipitates are not generated with an emulsifier.

Food

The food of the present invention is a food containing the pigment preparation of the present invention.

Alternatively, the food of the present invention is a food containing an agent for suppressing generation of precipitates of an anthocyanin pigment of the present invention (e.g., a food containing an anthocyanin pigment and an agent for suppressing generation of precipitates of the anthocyanin pigment of the present invention).

Alternatively, the food of the present invention is a food in which a method for suppressing generation of precipitates of an anthocyanin pigment of the present invention is applied to itself or its production.

The food of the present invention is understood with reference to the explanations or the like of the pigment preparation of the present invention, the agent for suppressing generation of precipitates of an anthocyanin pigment of the present invention, and the method for suppressing generation of precipitates of an anthocyanin pigment of the present invention.

The food of the present invention is produced, for example, by adding the pigment preparation of the present invention to a food.

The water content of the food of the present invention is preferably 85 mass % or less, more preferably 80 mass % or less, further preferably 75 mass % or less, and further more preferably 70 mass % or less.

The food of the present invention contains none or a small amount of precipitates of anthocyanin even when the food has a pH of more than 3 (preferably 3.5 or more, more preferably 4 or more, further preferably 4.5 or more, further more preferably 5 or more).

Further, even when the food of the present invention is exposed to a pH of more than 3 (preferably 3.5 or more, more preferably 4 or more, further preferably 4.5 or more, further more preferably 5 or more), the generation of precipitations of an anthocyanin pigment is suppressed.

The Method for Coloring Food

The present invention also provides a method for coloring a food, comprising adding the anthocyanin pigment preparation of the present invention to a food.

The production method is understood with reference to the explanations or the like of the pigment preparation of the present invention.

Method for Producing Colored Food

The present invention also provides a method for producing a colored food, comprising adding the anthocyanin pigment preparation of the present invention to a food.

The production method is understood with reference to the explanations or the like of the pigment preparation of the present invention.

EXAMPLES

The present invention is explained in detail below with reference to Examples; however, the present invention is not limited to the Examples.

The tests and analyses in the Examples were performed as follows.

Measurement of Color Value (1) A sample was precisely weighed within a range in which the measurement absorbance fell within a range of 0.3 to 0.7, and a citrate buffer (pH of 3.0) was added to make the amount precisely 100 ml, thereby preparing a test solution. In this step, if the test solution contained precipitates, a liquid portion was obtained by centrifugation and used as a test liquid.

(2) Using a citrate buffer as a control, absorbency A was measured at a maximum absorption wavelength in a wavelength range of 500 to 550 nm and at a liquid layer length of 1 cm, and the color value ($E^{10\%}_{1\,cm}$) as a measurement target was determined according to the formula below.

$$\text{Color value}(E^{10\%}_{1\,cm}) = (A \times 10)/\text{sample collection amount (g)}$$

Adjustment of pH pH was adjusted by adding trisodium citrate or sodium hydroxide. To adjust the pH of the solution to 5 or less, trisodium citrate was used; to adjust the pH of the solution to more than 5, sodium hydroxide was used.

Color Value Residual Ratio

The color value residual ratio of the pigment preparation was determined by measuring the color value of a liquid portion obtained as follows.

A sample of the pigment preparation was diluted with water or dissolved in water to prepare a pigment solution A having a color value of 20.

If the sample of the pigment preparation contained ethanol, a pigment solution A' was prepared by removing ethanol by concentrating a mixed liquid of 100 g of the pigment solution A and 50 g of water using a rotary evaporator at 40° C. until the weight became 100 g.

The pigment solution A or the pigment solution A' in an amount of 50 g was dispensed in a transparent plastic container and was allowed to stand at 5° C. for 24 hours; thereafter, the pigment solution was subjected to gyratory shaking for 60 minutes at an amplitude of 50 mm, 150 rpm, and 20° C.; and the liquid portion was obtained from the container by decantation immediately thereafter (more specifically, without performing still standing for 1 minute or more).

Formula 1:
$$\text{Color value residual ratio (\%)} = \text{color value of liquid portion}/20 \times 100.$$

Visual Evaluation of Generation of Precipitates

The visual evaluation of generation of precipitates was performed by visually evaluating the amount of residues that remained after the liquid portion was separated from a plastic centrifuge tube by decantation after shaking in determining the color value residual ratio.

The results of the visual evaluation are denoted as follows.

−: None
+: Small Amount
++: Intermediate
+++: Large Amount

Figure 1:
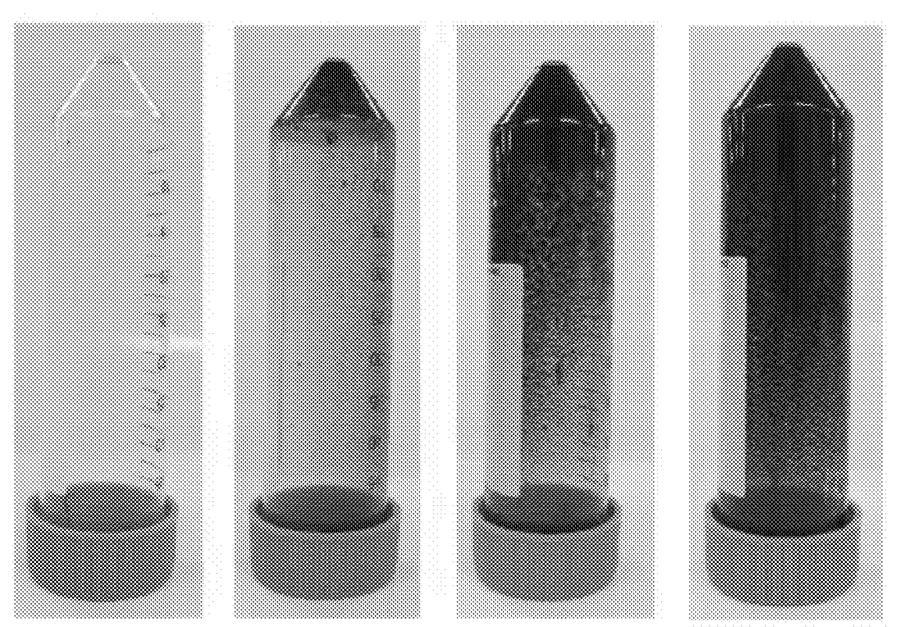
FIG. 1: An image showing an index of precipitation.

FIG. 1 is an image showing the amount of the residues used as an index of the visual evaluation.

In the image of FIG. 1, from left to right, −: None, +: Small Amount, ++: Intermediate, and +++: Large Amount.

Test Example 1 (Preliminary Experiment: Precipitation of Anthocyanin Pigment Under High pH Condition Red radish pigment aqueous solutions (with no emulsifier added) having a color value of 20.00 and the various pHs shown in Table 1 were prepared. Each red radish pigment aqueous solution was placed in a transparent plastic centrifuge tube and stored in a refrigerator (5° C., 24 hours).

After the refrigeration storage, the color value was measured and the color value residual ratio was determined by calculation. Further, the amount of generation of precipitates of an anthocyanin pigment was visually confirmed.

Table 1 shows the results.

TABLE 1

| | pH | | | | | | |
|---|---|---|---|---|---|---|---|
| | 2.5 | 3.5 | 4.0 | 4.5 | 5.0 | 6.0 | 8.0 |
| Color Value after 24 Hours | 20.00 | 7.61 | 6.08 | 7.80 | 8.98 | 11.47 | 17.92 |
| Color Value Residual Ratio | 100.0% | 38.0% | 30.4% | 39.0% | 44.9% | 57.3% | 89.6% |
| Visual Evaluation of Generation of Precipitates | − | +++ | +++ | +++ | +++ | ++ | − |

As shown in the results in Table 1, in the range of a pH of 3.5 to a pH of 6.0, the color value was decreased and precipitates of the anthocyanin pigment were generated at a time point 24 hours after the standing.

Test Example 2 (Test 1 for Suppressing Precipitation by Adding Gum Arabic (Color Value of 20.00))

Red radish pigment aqueous solutions (having a color value of 20.00 and a pH of 4.0) containing gum arabic in the amounts shown in Table 2 were prepared. The same test and evaluation as those in Test Example 1 were performed using these red radish pigment aqueous solutions.

Table 2 shows the results.

TABLE 2

| | Gum Arabic Content (Weight %) | | | | | |
|---|---|---|---|---|---|---|
| | 0 | 1 | 3 | 5 | 7 | 10 |
| Gum Arabic Content per Color Value (Weight %) | 0 | 0.05 | 0.15 | 0.25 | 0.35 | 0.5 |
| Color Value after 24 Hours | 6.08 | 15.42 | 19.79 | 19.75 | 19.78 | 19.70 |
| Color Value Residual Ratio | 30.4% | 77.1% | 98.9% | 98.7% | 98.9% | 98.5% |
| Visual Evaluation | +++ | + | − | − | − | − |

As shown in the results in Table 2, by adding gum arabic, the generation of precipitates of the anthocyanin pigment and the decrease in color value after standing for 24 hours were suppressed. In particular, by adding gum arabic in an amount (content) of 3 wt % or more, the decrease in color value and the generation of precipitates of the anthocyanin pigment were significantly suppressed. This suggests that the suppression effects depended on the amount of gum arabic.

Test Example 3 (Precipitation Suppression Test Using Various Anthocyanin Pigments)

Instead of the red radish pigment used in Test Example 2, a red cabbage pigment, a purple sweet potato pigment, a grape juice pigment, and a purple corn pigment were used as anthocyanin pigments. Anthocyanin pigment solutions (pH of 5.0, color value of 30.00, gum arabic content of 10 wt %) were prepared from these pigments and stored in a refrigerator (5° C., 24 hours). As a control, an anthocyanin pigment aqueous solution (pH of 5.0) in which an emulsifier was not added was used. Thereafter, a simple visual confirmation was performed to confirm the presence of precipitation, with the result that the generation of precipitates of the anthocyanin pigment was suppressed in each of these anthocyanin pigment aqueous solutions (visual evaluation: "−"), compared with the control.

Test Example 4 (Test 1 for Suppressing Precipitation by Adding Various Emulsifiers)

Instead of the gum arabic used in Test Example 2, red radish pigment aqueous solutions (color value of 50.00, pH of 5.0) were prepared using, as the emulsifier, 10 weight % of glycerin fatty acid ester (polyglycerin fatty acid ester), 10 weight % of polysorbate (polysorbate 20), 10 weight % and 20 weight % of plant lecithin (soybean lecithin), 10 weight % of quillaia extract, 10 weight % of gum arabic, 4 weight % of pectin, and 10 weight % of water-soluble soybean polysaccharide. The resulting aqueous solutions were stored in a refrigerator (5° C., 24 hours). As a control, a red radish pigment aqueous solution (color value of 50.00, pH of 5.0) in which an emulsifier was not added was used. Thereafter, a simple visual confirmation was performed to confirm the presence of precipitation, with the result that the generation of precipitates of the anthocyanin pigment was suppressed in each of these anthocyanin pigment aqueous solutions (visual evaluation: "−"), compared with the control.

Test Example 5 (Test 2 for Suppressing Precipitation by Adding Various Emulsifiers)

Red radish pigment aqueous solutions (with a color value of 20.00) containing, instead of the gum arabic in Test Example 2, the various kinds of emulsifiers in the amounts shown in Table 3 and having the pHs specified in Table 3 were prepared. The same test and evaluation as those in Test Example 1 were performed using these red radish pigment aqueous solutions.

Table 3 shows the results.

TABLE 3

| | pH | | | | | | |
|---|---|---|---|---|---|---|---|
| | 4.0 | 5.0 | 4.0 | 5.0 | 5.0 | 5.0 | 5.0 |
| Emulsifier | Pectin | | Gum Ghatti | | Soybean Polysaccharide | Polysorbate 20 | Quillaia Extract |
| Emulsifier Content (Weight %) | 4 | 2 | 10 | 5 | 10 | 10 | 10 |
| Emulsifier Content per Color Value (Weight %) | 0.2 | 0.1 | 0.5 | 0.25 | 0.5 | 0.5 | 0.5 |
| Color Value after 24 Hours | 19.84 | 19.75 | 19.72 | 19.74 | 19.24 | 18.75 | 18.26 |
| Color Value Residual Ratio | 99.2% | 98.7% | 98.6% | 98.7% | 96.2% | 93.7% | 91.3% |
| Visual Evaluation | — | — | — | — | — | — | — |

As shown in the results in Table 3, as in the case of adding gum arabic, the generation of precipitates of the anthocyanin pigment and the decrease in color value after standing for 24 hours were suppressed by adding various emulsifiers.

Test Example 6 (Precipitation Suppression Test Using Purple Sweet Potato Pigment)

Purple sweet potato pigment aqueous solutions (with a color value of 20.00) having the formulations and properties shown in Table 4 were prepared using, instead of the red radish pigment in Test Example 2, a purple sweet potato pigment. The same test and evaluation as those in Test Example 1 were performed using these purple sweet potato pigment aqueous solutions.

Table 4 shows the results.

As shown in the results in Table 4, also for a purple sweet potato pigment, the generation of precipitates of the anthocyanin pigment and the decrease in color value after standing for 24 hours were suppressed.

Test Example 7 (Precipitation Suppression Test Using Red Cabbage Pigment)

Red cabbage pigment aqueous solutions (with a color value of 20.00) having the formulations and properties shown in Table 5 were prepared using, instead of the red radish pigment in Test Example 2, a red cabbage pigment. The same test and evaluation as those in Test Example 1 were performed using these red cabbage pigment aqueous solutions.

TABLE 4

| | pH | | | | | | | |
|---|---|---|---|---|---|---|---|---|
| | 4.0 | 4.0 | 5.0 | 5.0 | 5.0 | 5.0 | 5.0 | 5.0 |
| Emulsifier | Gum Arabic | | | | Glycerin Fatty Acid Ester (Polyglycerin Fatty Acid Ester) | Soybean Polysaccharide | Gum Ghatti | Pectin |
| Emulsifier Content (Weight %) | 0 | 5 | 0 | 5 | 10 | 10 | 10 | 4 |
| Emulsifier Content per Color Value (Weight %) | 0 | 0.25 | 0 | 0.25 | 0.5 | 0.5 | 0.5 | 0.2 |
| Color Value after 24 Hours | 11.02 | 19.75 | 11.52 | 19.64 | 19.64 | 19.46 | 19.58 | 19.92 |
| Color Value Residual Ratio | 55.1% | 98.8% | 57.6% | 98.2% | 98.2% | 97.3% | 97.9% | 99.6% |
| Visual Evaluation | +++ | − | +++ | − | − | − | − | − |

Table 5 shows the results.

TABLE 5

| Pigment | Red Cabbage | | | |
|---|---|---|---|---|
| pH | 4.0 | | 5.0 | |
| Emulsifier | Gum Arabic | | | |
| Emulsifier Content (Weight %) | 0 | 5 | 0 | 5 |
| Emulsifier Content per Color Value (Weight %) | 0 | 0.25 | 0 | 0.25 |
| Color Value after 24 Hours | 18.18 | 19.49 | 18.40 | 19.58 |
| Color Value Residual Ratio | 90.9% | 97.4% | 86.3% | 96.6% |
| Visual Evaluation | ++ | − | ++ | − |

As shown in the results in Table 5, also for a red cabbage pigment, the generation of precipitates of the anthocyanin pigment and the decrease in color value after standing for 24 hours were suppressed.

Test Example 8 (Test 2 for Suppressing Precipitation by Adding Gum Arabic (Color Value of 100.00))

Red radish pigment aqueous solutions (with a color value of 100.00) containing gum arabic in the amounts shown in Table 6 were prepared.

After the red radish pigment aqueous solutions were allowed to stand at 5° C. for 24 hours, a simple visual confirmation was performed to confirm the presence of precipitation. Table 6 shows the results.

TABLE 6

| | Gum Arabic Content (Weight %) | | | | | | | |
|---|---|---|---|---|---|---|---|---|
| | 0 | 8 | 10 | 0 | 6 | 8 | 10 | 12 |
| Gum Arabic Content per Color Value (Weight %) | 0 | 0.08 | 0.10 | 0 | 0.06 | 0.08 | 0.10 | 0.12 |
| pH | 4.5 | 4.5 | 4.5 | 5.0 | 5.0 | 5.0 | 5.0 | 5.0 |
| Visual Evaluation | +++ | − | − | +++ | + | − | − | − |

As shown in the results in Table 6, by adding gum arabic, the generation of precipitates of the anthocyanin pigment after standing for 24 hours were suppressed. In particular, by adding gum arabic in an amount of 8 wt % or more (0.08 wt % or more per color value), the generation of precipitates of the anthocyanin pigment was significantly suppressed.

In contrast, formation of precipitates was observed in the sample in which gum arabic was not added at a time point in which red radish pigment aqueous solutions were prepared.

In addition, the red radish pigment aqueous solutions prepared above were diluted with water to prepare pigment solutions having a color value of 20, and each pigment solution was placed in a transparent plastic centrifuge tube and stored in a refrigerator (5° C., 24 hours). The color value was measured after the refrigeration storage, and the pigment residual ratio was determined by calculation. Further, the amount of generation of precipitates of the anthocyanin pigment was visually confirmed.

Table 7 shows the results.

TABLE 7

| Gum Arabic Content (Weight %) | 1.6 | 2.0 | 1.6 | 2.0 | 2.4 |
|---|---|---|---|---|---|
| Gum Arabic Content per Color Value (Weight %) | 0.08 | 0.10 | 0.08 | 0.10 | 0.12 |
| pH | 4.5 | 4.5 | 5.0 | 5.0 | 5.0 |
| Color Value after 24 Hours | 18.3 | 19.6 | 19.0 | 19.9 | 19.7 |
| Color Value Residual Ratio | 91.5% | 98.0% | 95.0% | 99.5% | 98.5% |
| Visual Evaluation | − | − | − | − | − |

As shown in the results in Table 7, by adding gum arabic, the decrease in color value after 24-hour standing was suppressed.

Test Example 9 (Test 3 for Suppressing Precipitation by Adding Gum Arabic (Powder Preparation))

The red radish pigment aqueous solutions (with gum arabic added) prepared in Test Example 8 were dried with a spray drier to prepare powdered red radish pigment preparations (having a color value of 300). In this step, dextrin was used as an excipient.

Each of the red radish pigment preparations prepared above was dissolved in water to prepare a pigment solution having a color value of 20, and the pigment solution was placed in a transparent plastic centrifuge tube and stored in a refrigerator (5° C., 24 hours). The color value was measured after the refrigeration storage, and the pigment residual ratio was determined by calculation. Further, the amount of generation of precipitates of the anthocyanin pigment was visually confirmed.

Table 8 shows the results. The gum arabic content in the table shows a gum arabic content (concentration) in a red radish pigment solution having a color value of 20.

TABLE 8

| Gum Arabic Content (Weight %) | 1.6 | 2.0 | 1.6 | 2.0 | 2.4 |
|---|---|---|---|---|---|
| Gum Arabic Content per Color Value (Weight %) | 0.08 | 0.10 | 0.08 | 0.10 | 0.12 |
| pH | 4.5 | 4.5 | 5.0 | 5.0 | 5.0 |
| Color Value after 24 Hours | 18.0 | 19.3 | 19.3 | 19.5 | 19.8 |
| Color Value Residual Ratio | 90.0% | 96.5% | 96.5% | 97.5% | 99.0% |
| Visual Evaluation | − | − | − | − | − |

As shown in the results in Table 8, also for powdered pigments, the generation of precipitates of the anthocyanin pigment and the decrease in color value after standing for 24 hours were suppressed by adding gum arabic.

Test Example 10 (Test 1 for Suppressing Precipitation by Adding Glycerin Fatty Acid Ester)

Red radish pigment aqueous solutions (color value of 150.00) containing glycerin fatty acid ester (polyglycerin fatty acid ester) in the amounts shown in Table 9 were prepared.

After the red radish pigment aqueous solutions were allowed to stand at 5° C. for 24 hours, a simple visual confirmation was performed to confirm the presence of precipitation. Table 9 shows the results.

TABLE 9

| Glycerin Fatty Acid Ester (Polyglycerin Fatty Acid Ester) Content (Weight %) | 0.0 | 4.5 | 9.0 |
|---|---|---|---|
| Glycerin Fatty Acid Ester Content per Color Value (Weight %) | 0 | 0.03 | 0.06 |
| pH | 4.5 | 4.5 | 4.5 |
| Visual Evaluation | +++ | − | − |

As shown in the results in Table 9, by adding glycerin fatty acid ester, the generation of precipitates of the anthocyanin pigment after standing for 24 hours was suppressed.

In contrast, formation of precipitates was observed in the sample in which glycerin fatty acid ester was not added at a time point in which the red radish pigment aqueous solutions were prepared.

In addition, the red radish pigment aqueous solution prepared above were diluted with water to prepare pigment solutions having a color value of 20, and each pigment solution was placed in a transparent plastic centrifuge tube and stored in a refrigerator (5° C., 24 hours). The color value was measured after the refrigeration storage, and the pigment residual ratio was determined by calculation. Further, the amount of generation of precipitates of the anthocyanin pigment was visually confirmed.

Table 10 shows the results.

TABLE 10

| Glycerin Fatty Acid Ester (Polyglycerin Fatty Acid Ester) Content (Weight %) | 0.6 | 1.2 |
|---|---|---|
| Glycerin Fatty Acid Ester Content per Color Value (Weight %) | 0.03 | 0.06 |
| pH | 4.5 | 4.5 |
| Color Value after 24 Hours | 18.7 | 19.6 |
| Color Value Residual Ratio | 93.5% | 98.0% |
| Visual Evaluation | − | − |

As shown in the results in Table 10, by adding glycerin fatty acid ester, the generation of precipitates of the anthocyanin pigment and the decrease in color value after standing for 24 hours were suppressed.

Test Example 11 (Test 2 for Suppressing Precipitation by Adding Glycerin Fatty Acid Ester (Powder Preparation))

The red radish pigment aqueous solutions prepared in Test Example 10 were dried with a spray drier to prepare powdered red radish pigment preparations (having a color value of 450). In this step, dextrin was used as an excipient.

Each of the red radish pigment preparations prepared above was dissolved in water to prepare a pigment solution having a color value of 20, and the pigment solution was placed in a transparent plastic centrifuge tube and stored in a refrigerator (5° C., 24 hours). The color value was measured after the refrigeration storage, and the pigment residual ratio was determined by calculation. Further, the amount of generation of precipitates of the anthocyanin pigment was visually confirmed.

Table 11 shows the results. The glycerin fatty acid ester content in the table shows a glycerin fatty acid ester content (concentration) in a red radish pigment solution having a color value of 20.

TABLE 11

| Glycerin Fatty Acid Ester (Polyglycerin Fatty Acid Ester) Content (Weight %) | 0.6 | 1.2 |
|---|---|---|
| Glycerin Fatty Acid Ester Content per Color Value (Weight %) | 0.03 | 0.06 |
| pH | 4.5 | 4.5 |
| Color Value after 24 Hours | 19.1 | 19.8 |
| Color Value Residual Ratio | 95.5% | 99.0% |
| Visual Evaluation | − | − |

As shown in the results in Table 11, also for powder preparations, the generation of precipitates of the anthocyanin pigment and the decrease in color value after standing for 24 hours were suppressed by adding glycerin fatty acid ester.

Test Example 12 (Precipitation Suppression Test for Powder Preparation)

According to the formulations shown in Table 12, powder preparations containing red radish pigments were prepared.

More specifically, a red radish pigment (powder, color value of 500.00) was added to a solution containing water and an emulsifier, and then sodium hydroxide was added to the mixture to adjust the pH of the solution to 5. The solution was dried with a spray drier, thereby preparing a powder preparation containing a red radish pigment (having a color value of 300.00). In this step, dextrin was used as an excipient.

Each of the powder preparations prepared above was dissolved in water to prepare a pigment solution having a color value of 20.00, and the pigment solution was placed in a transparent plastic centrifuge tube and stored in a refrigerator (5° C., 24 hours). The color value was measured after the refrigeration storage, and the pigment residual ratio was determined by calculation. Further, the amount of generation of precipitates of the anthocyanin pigment was visually confirmed.

Table 13 shows the results.

TABLE 12

| Red Radish Pigment (Powder, Color Value of 500) (Parts by Weight) | 20.0 | 25.0 |
|---|---|---|
| Emulsifier (Gum Arabic) (Parts by Weight) | 10.0 | — |
| Emulsifier (Glycerin Fatty Acid Ester (Polyglycerin Fatty Acid Ester)) (Parts by Weight) | — | 5.0 |
| Water (Parts by Weight) | 67.5 | 67.5 |
| Sodium Hydroxide (Parts by Weight) | 2.5 | 2.5 |
| Emulsifier Content per Color Value (Weight %) | 0.1 | 0.04 |

TABLE 13

| Emulsifier Content per Color Value (Weight %) | 0.1 | 0.04 |
|---|---|---|
| Color Value after 24 Hours | 19.9 | 19.6 |
| Color Value Residual Ratio | 99.5% | 98.0% |
| Visual Evaluation | − | − |

As shown in the results in Table 13, also for powder preparations, the generation of precipitates of the anthocyanin pigment and the decrease in color value after standing for 24 hours were suppressed by adding emulsifiers.

Test Example 13 (Coloring of Food and Drinks)

According to the formulations shown in Table 14, powder preparations containing red radish pigments (color value of 250.00, pH of 6.6) were prepared in a manner similar to that of Test Example 12.

Each powder preparation thus prepared and cow's milk (pH of 6.6) were weighed at a ratio of 1:4 and mixed in a 50-mL beaker.

TABLE 14

| | |
|---|---|
| Red Radish Pigment (Powder, Color Value of 500) (Parts by Weight) | 17.0 |
| Emulsifier (Gum Arabic) (Parts by Weight) | 8.5 |
| Water (Parts by Weight) | 67.0 |
| Sodium Hydroxide (Parts by Weight) | 3.0 |
| Dextrin (Parts by Weight) | 4.5 |
| Color Value of Powder Preparation | 250 |

The pH of the cow's milk was 6.6 both before and after being mixed with the powder preparation. The present invention thus enabled coloring of cow's milk without greatly changing the pH of the cow's milk. Further, there was no precipitation in the mixture.

In contrast, as a comparative test, cow's milk was colored using, instead of the powder preparation of the present invention, a previously known powder preparation containing a red radish pigment (color value of 250.00, pH of 2.9, with no emulsifier added). The pH of the mixture of the previously known powder preparation and cow's milk was 4, and thus the pH of the cow's milk greatly changed. Further, a large amount of precipitates was generated. The precipitates were dissolved after adding citric acid to the mixture containing precipitates. This confirmed that the precipitates were derived from the anthocyanin pigment.

The invention claimed is:

1. A method for suppressing generation of precipitates of an anthocyanin pigment in a pH range of 3.5 to 7, the method comprising of bringing an anthocyanin pigment in which precipitates are not generated into contact with an emulsifier, wherein the emulsifier present in an amount of 0.01 wt % or more, based on a color value of 1 of the anthocyanin pigment, and the emulsifier is one or more selected from the group consisting of quillaia extracts, pectin, gum arabic, gum ghatti, xanthan gum, sodium carboxymethylcellulose, and water-soluble soybean polysaccharides.

2. A method for producing an anthocyanin pigment preparation in which generation of precipitates of an anthocyanin pigment in a pH range of 3.5 to 7 is suppressed, the method comprising mixing an anthocyanin pigment in which precipitates are not generated with an emulsifier, wherein the emulsifier present in an amount of 0.01 wt % or more, based on a color value of 1 of the anthocyanin pigment, and the emulsifier is one or more selected from the group consisting of quillaia extracts, pectin, gum arabic, gum ghatti, xanthan gum, sodium carboxymethylcellulose, and water-soluble soybean polysaccharides.

* * * * *